(12) United States Patent
Karasudani et al.

(10) Patent No.: US 7,363,331 B2
(45) Date of Patent: Apr. 22, 2008

(54) FILE DEVICE AND FILE ACCESS METHOD

(75) Inventors: Akira Karasudani, Kawasaki (JP); Yoshiyuki Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 241 days.

(21) Appl. No.: 10/033,905

(22) Filed: Jan. 3, 2002

(65) Prior Publication Data
US 2002/0059287 A1   May 16, 2002

Related U.S. Application Data

(63) Continuation of application No. PCT/JP99/04711, filed on Aug. 31, 1999.

(51) Int. Cl.
*G06F 17/00* (2006.01)
(52) U.S. Cl. .............. 707/204; 707/203; 707/102; 707/101; 707/100
(58) Field of Classification Search ............ 707/204
See application file for complete search history.

(56) References Cited

U.S. PATENT DOCUMENTS

| | | | |
|---|---|---|---|
| 5,390,328 A * | 2/1995 | Frey et al. ............... | 719/315 |
| 5,504,883 A | 4/1996 | Coverston et al. | |
| 5,537,574 A * | 7/1996 | Elko et al. ............... | 711/141 |
| 5,829,005 A | 10/1998 | Senator | |
| 5,926,821 A | 7/1999 | Hirose et al. | |
| 6,618,737 B2 * | 9/2003 | Aridor et al. ............. | 707/205 |

FOREIGN PATENT DOCUMENTS

| | | |
|---|---|---|
| JP | 5-108427 | 4/1993 |
| JP | 5-120106 | 5/1993 |
| JP | 6-168269 | 6/1994 |
| JP | 7-105054 | 4/1995 |
| JP | 7-200378 | 8/1995 |
| JP | 10-63555 | 3/1998 |
| JP | 10-97448 | 4/1998 |
| JP | 98/26353 | 6/1998 |
| JP | 11-53240 | 2/1999 |

OTHER PUBLICATIONS

IBM document Dec. 2001.*

\* cited by examiner

*Primary Examiner*—Sana Al-Hashemi
(74) *Attorney, Agent, or Firm*—Staas & Halsey LLP

(57) ABSTRACT

The present invention relates to a file device and file access method that divides a file into units of clusters or blocks and records, and has as its object to provide a file device and file access method such that even when there is a failure and the data is not recorded correctly to the end the data that has been recorded can be accessed. When recording a file to an external storage device divided among a plurality of blocks, the blocks that are to record the file are pre-allocated in the external storage device, management information that indicates the allocated blocks is created and the management information is recorded in the external storage device, after which the data that makes up the file is recorded in the external storage device.

24 Claims, 13 Drawing Sheets

FIG.2A

MANAGEMENT INFORMATION
FILE MANAGEMENT INFORMATION

| FILE NAME | FILE SIZE | LEAD BLOCK |
|---|---|---|
| XXXA | 2560 BYTES | 1 |
| XXXB | 1030 BYTES | 6 |
| XXXC | 1024 BYTES | 9 |
| ...... | ...... | ...... |

FIG.2B

BLOCK ALLOCATION INFORMATION
(SUCCEEDING BLOCK IN PARENTHESES)

| 1(2) | 2(3) | 3(4) | 4(5) | 5(LAST) |
|---|---|---|---|---|
| 6(7) | 7(8) | 8(LAST) | 9(10) | 10(11) |
| 11(12) | 12(LAST) | 13(UNALLOCATED) | 14(UNALLOCATED) | 15(UNALLOCATED) |
| 16(UNALLOCATED) | 17(UNALLOCATED) | 18(UNALLOCATED) | 19(UNALLOCATED) | 20(UNALLOCATED) |
| ...... | ...... | ...... | ...... | ...... |

FIG.2C

DATA
FILE XXXA

| BLOCK NUMBER | BLOCK 1 | BLOCK 2 | BLOCK 3 | BLOCK 4 | BLOCK 5 |
|---|---|---|---|---|---|
| DATA | DATA | DATA | DATA | DATA | DATA |

FIG.2D

FILE XXXB

| BLOCK NUMBER | BLOCK 6 | BLOCK 7 | BLOCK 8 |
|---|---|---|---|
| DATA | DATA | DATA | DATA |

FIG.2E

FILE XXXC

| BLOCK NUMBER | BLOCK 9 | BLOCK 10 | BLOCK 11 | BLOCK 12 |
|---|---|---|---|---|
| DATA | DATA | DATA | DATA | DATA |

FIG.7A

MANAGEMENT INFORMATION 113
(1) FILE MANAGEMENT INFORMATION 115

| FILE NAME | FILE SIZE | LEAD BLOCK | FINAL BLOCK |
|---|---|---|---|
| XXXA | 2560 BYTES | 1 | 5 |
| XXXB | 1030 BYTES | 6 | 8 |
| XXXC | 1024 BYTES | 9 | 12 | ← FILE BEING CREATED
| ...... | ...... | ...... | ...... |

FIG.7B (2) BLOCK ALLOCATION INFORMATION
(SUCCEEDING BLOCK IN PARENTHESES) 116

| 1(2) | 2(3) | 3(4) | 4(5) | 5(LAST) |
|---|---|---|---|---|
| 6(7) | 7(8) | 8(LAST) | 9(10) | 10(11) |
| 11(12) | 12(LAST) | 13(UNALLOCATED) | 14(UNALLOCATED) | 15(UNALLOCATED) |
| 16(UNALLOCATED) | 17(UNALLOCATED) | 18(UNALLOCATED) | 19(UNALLOCATED) | 20(UNALLOCATED) |
| ...... | ...... | ...... | ...... | ...... |

FIG.7C

DATA
(1) FILE XXXA

| BLOCK NO. | BLOCK 1 | BLOCK 2 | BLOCK 3 | BLOCK 4 | BLOCK 5 |
|---|---|---|---|---|---|
| DATA | DATA | DATA | DATA | DATA | DATA |
| PRECEDING BLOCK NO. | LEAD | 1 | 2 | 3 | 4 |
| DATA SIZE | 512 BYTES | 512 BYTES | 512 BYTES | 512 BYTES | 512 BYTES |

FIG.7D (2) FILE XXXB

| BLOCK NO. | BLOCK 6 | BLOCK 7 | BLOCK 8 |
|---|---|---|---|
| DATA | DATA | DATA | DATA |
| PRECEDING BLOCK NO. | LEAD | 6 | 7 |
| DATA SIZE | 512 BYTES | 512 BYTES | 6 BYTES |

FIG.7E (3) FILE XXXC

| BLOCK NO. | BLOCK 9 | BLOCK 10 | BLOCK 11 | BLOCK 12 |
|---|---|---|---|---|
| DATA | DATA | DATA | DATA | DATA |
| PRECEDING BLOCK NO. | LEAD | 9 | 10 | 11 |
| DATA SIZE | 512 BYTES | 512 BYTES | 512 BYTES | 512 BYTES |

FIG.8A

MANAGEMENT INFORMATION 113
FILE MANAGEMENT INFORMATION 115

| FILE NAME | FILE SIZE | LEAD BLOCK | FINAL BLOCK | |
|---|---|---|---|---|
| XXXA | 2560 BYTES | 1 | 5 | |
| XXXB | 1030 BYTES | 5 | 8 | |
| XXXC | 4096 BYTES | 9 | 16 | ← FILE BEING CREATED |
| ...... | ...... | ...... | ...... | |

FIG.8B

BLOCK ALLOCATION INFORMATION
(SUCCEEDING BLOCK IN PARENTHESES) 116

| 1(2) | 2(3) | 3(4) | 4(5) | 5(LAST) |
|---|---|---|---|---|
| 6(7) | 7(8) | 8(LAST) | 9(10) | 10(11) |
| 11(12) | 12(LAST) | 13(14) | 14(15) | 15(16) |
| 16(LAST) | 17(UNALLOCATED) | 18(UNALLOCATED) | 19(UNALLOCATED) | 20(UNALLOCATED) |
| ...... | ...... | ...... | ...... | ...... |

FIG.8C

DATA (FILE XXXC)

| BLOCK NO. | BLOCK 9 | BLOCK 10 | BLOCK 11 | BLOCK 12 |
|---|---|---|---|---|
| DATA | DATA | DATA | DATA | DATA |
| PRECEDING BLOCK NO. | LEAD | 9 | 10 | 11 |
| DATA SIZE | 512 BYTES | 512 BYTES | 512 BYTES | 512 BYTES |
| BLOCK NO. | BLOCK 13 | BLOCK 14 | BLOCK 15 | BLOCK 16 |
| DATA | UNWRITTEN | UNWRITTEN | UNWRITTEN | UNWRITTEN |
| PRECEDING BLOCK NO. | UNWRITTEN | UNWRITTEN | UNWRITTEN | UNWRITTEN |
| DATA SIZE | UNWRITTEN | UNWRITTEN | UNWRITTEN | UNWRITTEN |

IMMEDIATELY FOLLOWING BLOCK ALLOCATION

FIG.8D

DATA (FILE XXXC)

| BLOCK NO. | BLOCK 9 | BLOCK 10 | BLOCK 11 | BLOCK 12 |
|---|---|---|---|---|
| DATA | DATA | DATA | DATA | DATA |
| PRECEDING BLOCK NO. | LEAD | 9 | 10 | 11 |
| DATA SIZE | 512 BYTES | 512 BYTES | 512 BYTES | 512 BYTES |
| BLOCK NO. | BLOCK 13 | BLOCK 14 | BLOCK 15 | BLOCK 16 |
| DATA | DATA | DATA | DATA | DATA |
| PRECEDING BLOCK NO. | 12 | 13 | UNWRITTEN | UNWRITTEN |
| DATA SIZE | 512 BYTES | 512 BYTES | UNWRITTEN | UNWRITTEN |

BEING WRITTEN TO AN ALLOCATED BLOCK

FIG.9A

MANAGEMENT INFORMATION 113
(1) FILE MANAGEMENT 115

| FILE NAME | FILE SIZE | LEAD BLOCK | FINAL BLOCK |
|---|---|---|---|
| XXXA | 2560 BYTES | 1 | 5 |
| XXXB | 1030 BYTES | 5 | 8 |
| XXXC | 4096 BYTES | 9 | 16 | ← FILE BEING CREATED
| ...... | ...... | ...... | ...... |

FIG.9B (2) BLOCK ALLOCATION INFORMATION
(SUCCEEDING BLOCK IN PARENTHESES) 116

| 1(2) | 2(3) | 3(4) | 4(5) | 5(LAST) |
|---|---|---|---|---|
| 6(7) | 7(8) | 8(LAST) | 9(10) | 10(11) |
| 11(12) | 12(LAST) | 13(14) | 14(15) | 15(16) |
| 16(LAST) | 17(UNALLOCATED) | 18(UNALLOCATED) | 19(UNALLOCATED) | 20(UNALLOCATED) |
| ...... | ...... | ...... | ...... | ...... |

FIG.9C

DATA (FILE XXXC)

| BLOCK NO. | BLOCK 9 | BLOCK 10 | BLOCK 11 | BLOCK 12 |
|---|---|---|---|---|
| DATA | DATA | DATA | DATA | DATA |
| PRECEDING BLOCK NO. | LEAD | 9 | 10 | 11 |
| DATA SIZE | 512 BYTES | 512 BYTES | 512 BYTES | 512 BYTES |
| BLOCK NO. | BLOCK 13 | BLOCK 14 | BLOCK 15 | BLOCK 16 |
| DATA | DATA | DATA | DATA | DATA |
| PRECEDING BLOCK NO. | 12 | 13 | 14 | UNWRITTEN |
| DATA SIZE | 512 BYTES | 512 BYTES | 16 BYTES | UNWRITTEN |

WHEN WRITING THE LAST DATA

FIG.9D

MANAGEMENT INFORMATION 113
(1) FILE MANAGEMENT 115

| FILE NAME | FILE SIZE | LEAD BLOCK | FINAL BLOCK |
|---|---|---|---|
| XXXA | 2560 BYTES | 1 | 4 |
| XXXB | 1030 BYTES | 5 | 8 |
| XXXC | 3000 BYTES | 9 | 15 |
| ...... | ...... | ...... | ...... |

FIG.9E (2) BLOCK ALLOCATION INFORMATION
(SUCCEEDING BLOCK IN PARENTHESES) 116

| 1(2) | 2(3) | 3(4) | 4(5) | 5(LAST) |
|---|---|---|---|---|
| 6(7) | 7(8) | 8(LAST) | 9(10) | 10(11) |
| 11(12) | 12(13) | 13(14) | 14(15) | 15(LAST) |
| 16(UNALLOCATED) | 17(UNALLOCATED) | 18(UNALLOCATED) | 19(UNALLOCATED) | 20(UNALLOCATED) |
| ...... | ...... | ...... | ...... | ...... |

UPDATING THE MANAGEMENT INFORMATION

FIG.10A

MANAGEMENT INFORMATION 113
FILE MANAGEMENT INFORMATION 115

| FILE NAME | FILE SIZE | LEAD BLOCK | FINAL BLOCK |
|---|---|---|---|
| XXXA | 2560 BYTES | 1 | 4 |
| XXXB | 1030 BYTES | 5 | 8 |
| XXXC | 2048 BYTES | 9 | 12 |
| ...... | ...... | ...... | ...... |

← FILE BEING CREATED

FIG.10B

BLOCK ALLOCATION INFORMATION
(SUCCEEDING BLOCK IN PARENTHESES) 116

| 1(2) | 2(3) | 3(4) | 4(5) | 5(LAST) |
|---|---|---|---|---|
| 6(7) | 7(8) | 8(LAST) | 9(10) | 10(11) |
| 11(12) | 12(LAST) | 13(UNALLOCTED) | 14(UNALLOCATED) | 15(UNALLOCATED) |
| 16(UNALLOCATED) | 17(UNALLOCATED) | 18(UNALLOCATED) | 19(UNALLOCATED) | 20(UNALLOCATED) |
| ...... | ...... | ...... | ...... | ...... |

FIG.10C

DATA (FILE XXXC)

| BLOCK NO. | BLOCK 9 | BLOCK 10 | BLOCK 11 | BLOCK 12 |
|---|---|---|---|---|
| DATA | DATA | DATA | DATA | DATA |
| PRECEDING BLOCK NO. | LEAD | 9 | 10 | 11 |
| DATA SIZE | 512 BYTES | 512 BYTES | 512 BYTES | 512 BYTES |
| BLOCK NO. | BLOCK 13 | BLOCK 14 | BLOCK 15 | BLOCK 16 |
| DATA | UNWRITTEN | UNWRITTEN | UNWRITTEN | UNWRITTEN |
| PRECEDING BLOCK NO. | UNWRITTEN | UNWRITTEN | UNWRITTEN | UNWRITTEN |
| DATA SIZE | UNWRITTEN | UNWRITTEN | UNWRITTEN | UNWRITTEN |

PLURAL VIDEO IMAGE INPUTS

INDIVIDUAL VIDEO IMAGE DATA INFORMATION

| VIDEO IMAGE NAME | ENCRYPTION RATE | NUMBER OF BLOCKS | PRIORITY DEGREE |
|---|---|---|---|
| VIDEO IMAGE A | Vv(Mbps) | 4 | 1 |
| VIDEO IMAGE B | 2Vv(Mbps) | 4 | 1 |
| VIDEO IMAGE C | Vv(Mbps) | 4 | 1 |

SCHEDULING RULES

| ACCESS SEQUENCE | VIDEO IMAGE NAME | NUMBER OF WRITE BLOCKS |
|---|---|---|
| 1 | VIDEO IMAGE B | 4 |
| 2 | VIDEO IMAGE A | 4 |
| 3 | VIDEO IMAGE B | 4 |
| 4 | VIDEO IMAGE C | 4 |

FIG.13A

MANAGEMENT INFORMATION 113
FILE MANAGEMENT 115

| FILE NAME | FILE SIZE | LEAD BLOCK | FINAL BLOCK |
|---|---|---|---|
| VIDEO IMAGE A | 4096 BYTES | 5 | 24 |
| VIDEO IMAGE B | 8192 BYTES | 1 | 28 |
| VIDEO IMAGE C | 4096 BYTES | 13 | 32 |
| ...... | ...... | ...... | ...... |

← FILE BEING CREATED

FIG.13B

BLOCK ALLOCATION INFORMATION
(SUCCEEDING BLOCK IN PARENTHESES)

| | | | | |
|---|---|---|---|---|
| 1(2) | 2(3) | 3(4) | 4(9) | 5(6) |
| 6(7) | 7(8) | 8(21) | 9(10) | 10(11) |
| 11(12) | 12(17) | 13(14) | 14(15) | 15(16) |
| 16(29) | 17(18) | 18(19) | 19(20) | 20(21) |
| 21(22) | 22(23) | 23(24) | 24(LAST) | 25(26) |
| 26(27) | 27(28) | 28(LAST) | 29(30) | 30(31) |
| 31(32) | 32(LAST) | 33(UNALLOCATED) | 34(UNALLOCATED) | 35(UNALLOCATED) |
| ...... | ...... | ...... | ...... | ...... |

FIG.13C

DATA

| BLOCK NO. | 1 | 2 | 3 | 4 | 5 | 6 | 7 | 8 | 9 | 10 |
|---|---|---|---|---|---|---|---|---|---|---|
| DATA | B | B | B | B | A | A | A | A | B | B |
| PRECEDING BLOCK NO. AND DATA SIZE | ...... | ...... | ...... | ...... | ...... | ...... | ...... | ...... | ...... | ...... |
| BLOCK NO. | 11 | 12 | 13 | 14 | 15 | 16 | 17 | 18 | 19 | 20 |
| DATA | B | B | C | C | C | C | UN- | UN- | UN- | UN- |
| PRECEDING BLOCK NO. AND DATA SIZE | ...... | ...... | ...... | ...... | ...... | ...... | ...... | ...... | ...... | ...... |
| BLOCK NO. | 21 | 22 | 23 | 24 | 25 | 26 | 27 | 28 | 29 | 30 |
| DATA | UN- | UN- | UN- | UN- | UN- | UN- | UN- | UN- | UN- | UN- |
| PRECEDING BLOCK NO. AND DATA SIZE | ...... | ...... | ...... | ...... | ...... | ...... | ...... | ...... | ...... | ...... |
| BLOCK NO. | 31 | 32 | 33 | 34 | 35 | 36 | 37 | 38 | 39 | 40 |
| DATA | UN- | UN- | UN- | UN- | UN- | UN- | UN- | UN- | UN- | UN- |
| PRECEDING BLOCK NO. AND DATA SIZE | ...... | ...... | ...... | ...... | ...... | ...... | ...... | ...... | ...... | ...... |

FIG.14A

MANAGEMENT INFORMATION (IN HOST RAM)
FILE MANAGEMENT

| FILE NAME | FILE SIZE | LEAD BLOCK | FINAL BLOCK | PROVISIONALLY ALLOCATED BLOCK |
|---|---|---|---|---|
| VIDEO IMAGE A | 2560 BYTES | 5 | 24 | 37 |
| VIDEO IMAGE B | 1030 BYTES | 1 | 24 | 33 |
| VIDEO IMAGE C | 4096 BYTES | 13 | 16 | 29 |
| ...... | ...... | ...... | ...... | ...... |

FIG.14B

BLOCK ALLOCATION INFORMATION
(SUCCEEDING BLOCK IN PARENTHESES)

| 1(2) | 2(3) | 3(4) | 4(9) | 5(6) |
|---|---|---|---|---|
| 6(7) | 7(8) | 8(21) | 9(10) | 10(11) |
| 11(12) | 12(17) | 13(14) | 14(15) | 15(16) |
| 16(LAST) | 17(18) | 18(19) | 19(20) | 20(25) |
| 21(22) | 22(23) | 23(24) | 24(LAST) | 25(26) |
| 26(27) | 27(28) | 28(LAST) | 29(UNALLOCATED) | 30(UNALLOCATED) |
| 33(UNALLOCATED) | 32(UNALLOCATED) | ...... | ...... | ...... |

FIG.14C

MANAGEMENT INFORMATION (IN HOST RAM)
FILE MANAGEMENT

| FILE NAME | FILE SIZE | LEAD BLOCK | FINAL BLOCK | PROVISIONALLY ALLOCATED BLOCK |
|---|---|---|---|---|
| VIDEO IMAGE A | 2048 BYTES | 5 | 8 | 21 |
| VIDEO IMAGE B | 4096 BYTES | 1 | 12 | 17 |
| VIDEO IMAGE C | 2048 BYTES | 13 | 16 | 29 |
| ...... | ...... | ...... | ...... | ...... |

FIG.14D

BLOCK ALLOCATION INFORMATION
(SUCCEEDING BLOCK IN PARENTHESES)

| 1(2) | 2(3) | 3(4) | 4(9) | 5(6) |
|---|---|---|---|---|
| 6(7) | 7(8) | 8(LAST) | 9(10) | 10(11) |
| 11(12) | 12(LAST) | 13(14) | 14(15) | 15(16) |
| 16(LAST) | 17(UNALLOCATED) | 18(UNALLOCATED) | 19(UNALLOCATED) | 20(UNALLOCATED) |
| 21(UNALLOCATED) | 22(UNALLOCATED) | 23(UNALLOCATED) | 24(UNALLOCATED) | 25(UNALLOCATED) |
| 26(UNALLOCATED) | 27(UNALLOCATED) | 28(UNALLOCATED) | 29(UNALLOCATED) | 30(UNALLOCATED) |
| 31(UNALLOCATED) | 32(UNALLOCATED) | ...... | ...... | ...... |

FIG.14E

DATA (EXTERNAL STORAGE DEVICE)

| BLOCK NO. | 1 | 2 | 3 | 4 | 5 | 6 | 7 | 8 | 9 | 10 |
|---|---|---|---|---|---|---|---|---|---|---|
| SUCCEEDING BLOCK | 2 | 3 | 4 | 9 | 6 | 7 | 8 | 13 | 10 | 11 |
| DATA | B | B | B | B | A | A | A | A | B | B |
| PRECEDING BLOCK NO. AND DATA SIZE | ...... | ...... | ...... | ...... | ...... | ...... | ...... | ...... | ...... | ...... |
| BLOCK NO. | 11 | 12 | 13 | 14 | 15 | 16 | 17 | 18 | 19 | 20 |
| SUCCEEDING BLOCK | 12 | 17 | 14 | 15 | 16 | 29 | 18 | 19 | 20 | 25 |
| DATA | B | B | C | C | C | C | B | B | B | B |
| PRECEDING BLOCK NO. AND DATA SIZE | ...... | ...... | ...... | ...... | ...... | ...... | ...... | ...... | ...... | ...... |
| BLOCK NO. | 21 | 22 | 23 | 24 | 25 | 26 | 27 | 28 | 29 | 30 |
| SUCCEEDING BLOCK | 22 | 23 | 24 | 37 | 26 | 27 | 28 | 33 | UN- | UN- |
| DATA | A | A | A | A | B | B | B | B | UN- | UN- |
| PRECEDING BLOCK NO. AND DATA SIZE | ...... | ...... | ...... | ...... | ...... | ...... | ...... | ...... | ...... | ...... |

FILE DEVICE AND FILE ACCESS METHOD

This application is a continuing application filed under 35 U.S.C. § 111(a), based upon International Application PCT/JP99/04711, filed Aug. 31, 1999.

TECHNICAL FIELD

The present invention relates to a file device and file access method, and more particularly, to a file device and file access method that divides a file into units of clusters, blocks, or the like for recording and management.

BACKGROUND ART

Conventionally, OS (operating systems) such as MS-Windows and UNIX, when storing data to an external storage device, have stored connections of individual clusters, blocks or the like in management data called an FAT (File Allocation Table) and an index node (i-node).

In such a system, when a file is read out, the clusters or blocks corresponding to that file are accessed in sequence while referring to the management information.

Additionally, when storing a new file or when rewriting data, conventionally, clusters or blocks for storing the new data sequence are allocated and the data is recorded to the allocated sectors after the management information is updated.

When accessing the file, if the management information stored in the external storage device and the data sequence have been accessed alternately, a seek to the external storage device occurs for each access, which is inefficient. In order to undertake efficient access, the management information is temporarily stored in the system buffer and the data sequence only is recorded in the external storage device. After the data sequence is recorded, the management information is recorded from the buffer to the external storage device.

However, in such a system, when recording data in the external storage device, in the event of a forced termination of the system, a system shutdown due to a power failure, or forced ejection of the removable storage medium when the external storage device is of the removal storage medium type and so forth, the management information that has been temporarily stored in the buffer is not recorded in the external storage device. When the management information is not recorded in the external storage device and the file is accessed after restoration from any of the above-mentioned interruptions, because the management information has not been recorded a problem occurs in that the entire data recorded on the storage medium sequence cannot be read out.

In order to deal with the above-described drawback the following methods have conventionally been proposed.

(1) Uninterruptible Power Supply Device Method

An uninterruptible power supply device is typically called a UPS (Uninterruptible Power Supply) device, and supplies electric power for a certain period of time even after the occurrence of a power failure such as a system main power interruption or voltage drop. By using UPS, the supply of electric power to the system after a system shutdown is interrupted. The shutdown enables the data sequence and the management information to be written to the external storage device and the system to be terminated normally, so the system can be terminated with control of the data sequence and the management information.

(2) Recoverable Delay Storage File System Method

This method is a method used in NTFS (New Technology File System) which is an MS-Windows NT file system, in which log information for recording disk access separately from the management information and the data sequence.

With this method, when there is a failure the device checks the recorded block information and, based on the log information, engages in a recovery process such that the management information and the data are consistent.

(3) Additional Storage File System Method

The write-once file system is typically called the LFS (Log-structured Files System) method. The LFS is a system that continuously adds data sequences in sequence and stores management information at the end of the data sequence.

With LFS, when the management information for the added data sequence has been stored, that data sequence becomes valid. It should be noted that if management information for the data sequence in the added storage cannot be stored due to a failure, then the data sequence in the added storage becomes invalid and a recovery process is carried out using the preceding data sequence.

FIG. 1 is a diagram for explaining the operation of one example of the conventional art. FIG. 1(A) shows a data composition of a write-once file system, FIG. 1(B) illustrates the operation of adding new information to the storage file system, and FIG. 1(C) is a diagram illustrating operation during a failure of the write-once file system.

With the write-once file system, as shown in FIG. 1(A) a single data sequence formed of blocks B1-B3 is managed by a single piece of management information 1. The management information 1 is made up of information such as the single data sequence file name, the file size, the lead block and the file allocation. Access to the files is conducted based on the management information 1.

For example, when blocks B4 and B5 are added as shown in FIG. 1(B), new management information 2 including management information for the newly stored blocks B4, B5 is produced. It should be noted that when the new management information 2 is produced, the management information 1 for managing blocks B1-B3 becomes invalid.

If the management information 2 is not stored due to failure when new blocks B4 and B5 are stored as shown in FIG. 1(C), the newly added blocks B4 and B5 become invalid. But, the management information 1 remains so that the blocks B1-B3 can be read based on the management information 1.

FIG. 2 is a diagram showing one example of the conventional management information and file data composition. FIGS. 2(A) and 2(B) show the management information 1 and FIGS. 2(C)-2(E) show the file data composition.

The management information 1 is composed of the file management information 1*a* shown in FIG. 2(A) and the block allocation information 1*b* shown in FIG. 2(B).

The file management information 1*a* is composed of the file name, file size and lead block number data. From the file management information 1*a* it can be determined that the file of the file name "xxxA" has 2560 bites from the lead block 1.

Additionally, as shown in FIG. 2(B) the block allocation information 1*b* is composed of block numbers of individual blocks and the succeeding block number following the individual block.

As shown in FIG. 2(C)-(E), the files are arranged such that data of individual file names "xxxA", "xxxB" and "xxxC" is stored in blocks specified by the management information shown in FIGS. 2(A) and 2B.

For example, in order to access a file of the file name "xxxA", first, reference is made to the lead block "1" of the file name "xxxA" of the file management information shown in FIG. 2(A) and the block of the lead block number "1" is accessed. Next, reference is made to the block number "1" of the block allocation information shown in FIG. 2(B), and the block of the block number "2" that is the next to be accessed is accessed.

Continuing, reference is made to the block number "2" of the block allocation information shown in FIG. 2(B), and the block of block number "3" that is the next to be accessed is accessed. Access continues in the same way, with the block allocation information shown in FIG. 2(B) being accessed to the final block. As described above, data from the blocks numbered "1" through "5", in which the data of the file name "xxxA" is stored, is read out.

(4) Art disclosed in Japanese Laid-Open Patent Application No. 10-63555

In Japanese Laid-Open Patent Application No. 10-63555, a technique is described in which information for next indicating a block is included in the block for storing a data sequence and, if a discrepancy occurs between the management information and the stored data sequence, the management information is restored based on the information included in the block.

However, according to the conventional USP method of (1), the existence of a storage medium capable of storing data even during a failure is required, and suffers the disadvantage of being unable to cope when removable media are forcibly removed.

Similarly, the Recoverable Delay Storage File System Method shown in (2) and the Additional Storage File System Method shown in (3) conduct recovery based on effective management information content, so there is a possibility that newly stored data sequences will be discarded.

Moreover, with the method of Japanese Laid-Open Patent Application No. 10-63555 shown in (4), recovery of management information is conducted based on the information imbedded in the block, so it is necessary to access individual blocks of a data sequence in order. If the blocks have been stored randomly, however, then a seek occurs each time an individual block is accessed, creating the problem of necessitating processing time.

Similarly, recently applications have been proposed for storing a plurality of digital video images such as MPEG-1, MPEG-2 on an external storage device. With this sort of application, in order to record the digital video images that are continuously sent, it has been necessary to reduce overhead and carry out disk access efficiently. Disk access is composed of seek and rotational wait and data read processing. In order to hold down processes other than data read, it is desirable to record sequentially.

Here, with the method of Japanese Laid-Open Patent Application No. 10-63555 indicated in (4), in order to store the data sequence, it is necessary to store in one block information for the next block in order to make recovery from a failure possible. As a result, it is necessary to secure a location for the next block. Here, the case of a plurality of digital video images is considered. In order to store a plurality of digital video images without delay, it is necessary to schedule disk access according to the number of digital video image channels and the encoding rate and store a plurality of digital video image data sequentially. However, with the method of (4), when storing data to the next block, without regard to the disk access scheduling, there is a possibility that the information for the next block previously recorded to a block and the block might differ from the scheduled access order. As a result, random access occurs and disk access efficiency decreases. Accordingly, in order to store a plurality of digital video images, it is necessary to determine the block to be recorded based on the information at the time disk access is scheduled according to the number of video image channels and each video image transfer rate.

DISCLOSURE OF THE INVENTION

The present invention was conceived with the above-described points in mind, and has as its object to provide a file device and file access method that permits access to recorded data even in the event that data is not correctly stored to the end due to a failure.

The present invention, when recording a file to storage means divided among a plurality of blocks, allocates blocks to record the file in the storage means and records the files in the storage means after producing management information designating blocks allocated by the block allocation means and recording the management information produced by the management information production means in the storage means.

According to the present invention, the blocks that are to record the file in the storage means are already allocated and the file is recorded after recording the management information that indicates the allocated blocks in the storage means, so even if a failure occurs during file storage there is no loss of management data, and accordingly, data already recorded in the file can be read out based on the management information.

Additionally, the present invention attaches information indicating the preceding block and information indicating a size of data recorded in the block to data stored in each block, and records to the storage means.

According to the present invention, by attaching information indicating the preceding block and information indicating a size of data recorded in the block to data stored in each block, even when there is a disparity between the management data and the recorded data when reading out a file, confirming the preceding block and the size of the data recorded in the block makes it possible to identify valid data.

The present invention updates the management information so that, when a data-unrecorded block occurs among the blocks allocated by the block allocation means when recording the file, the unrecorded block becomes an unused block.

According to the present invention, by updating the management information so that, when a data-unrecorded block occurs among the blocks allocated by the block allocation means when recording the file, the unrecorded block becomes an unused block and the block can be used by another field, making effective use of an unrecorded block.

The present invention pre-sets a storage sequence of data that makes up the file, the data that makes up the file being recorded in blocks based on the set sequence.

According to the present invention, by pre-setting a storage sequence of data that makes up the file and recording the data that makes up the file in blocks based on the set sequence, it is possible to access the file efficiently.

The present invention, when information indicating the preceding block does not indicate the preceding block as a result of the block being accessed in sequence depending on the management information, the file being read out, and data being read out from the block, or when information indicating the size of the data recorded in the block is outside the actual block size range, halts readout of a file and updates the management information so that subsequent blocks become unused blocks.

According to the present invention, by halting readout of a file and updating the management information so that subsequent blocks become unused blocks when information indicating the preceding block does not indicate the preceding block as a result of the block being accessed in sequence depending on the management information, the file being read out, and data being read out from the block, or when information indicating the size of the data recorded in the block is outside the actual block size range, it is possible to stop the readout of incorrect data and it is possible to update the management information so that the stored blocks of incorrect data become unused blocks. As a result, blocks can be used by other files and effective use can be made of the unrecorded blocks.

BRIEF DESCRIPTION OF THE DRAWINGS

FIG. 2 is a diagram showing a conventional example of data composition of management information and data;

FIG. 7 is a diagram illustrating an operation of a first embodiment of the present invention;

FIG. 8 is a diagram illustrating an operation of a first embodiment of the present invention;

FIG. 9 is a diagram illustrating an operation of a first embodiment of the present invention;

FIG. 10 is a diagram illustrating an operation of a first embodiment of the present invention;

FIG. 12 is a diagram illustrating a scheduling of a second embodiment of the present invention;

FIG. 13 is a diagram illustrating an operation of a second embodiment of the present invention; and FIG. 14 is a diagram illustrating an operation of a third embodiment of the present invention.

BEST EMBODIMENTS FOR PRACTICING THE INVENTION

Figure 1A:
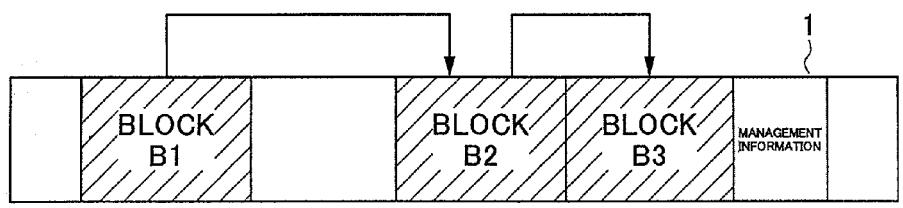
FIG. 1 is a diagram illustrating an operation of one example of the conventional art.
Figure 1B:
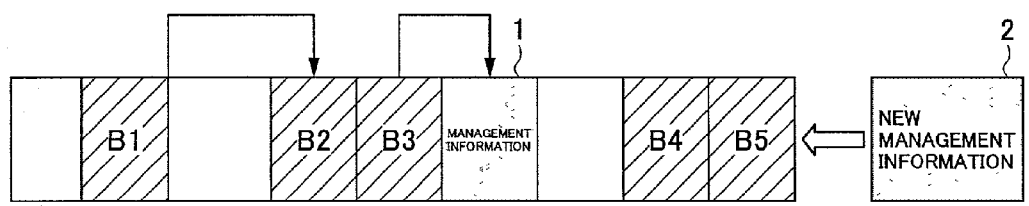
Figure 1C:
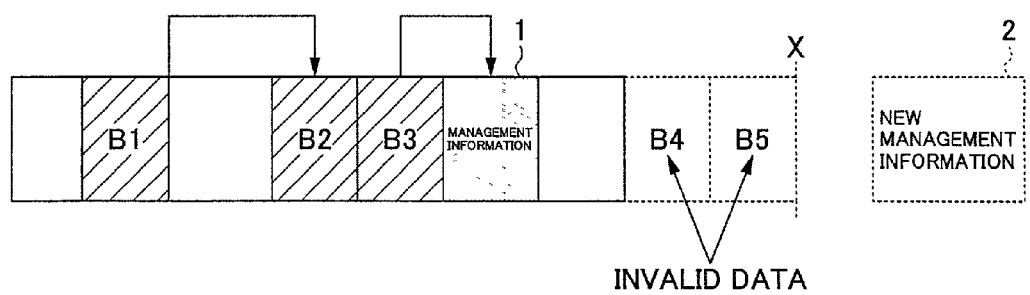
Figure 3:
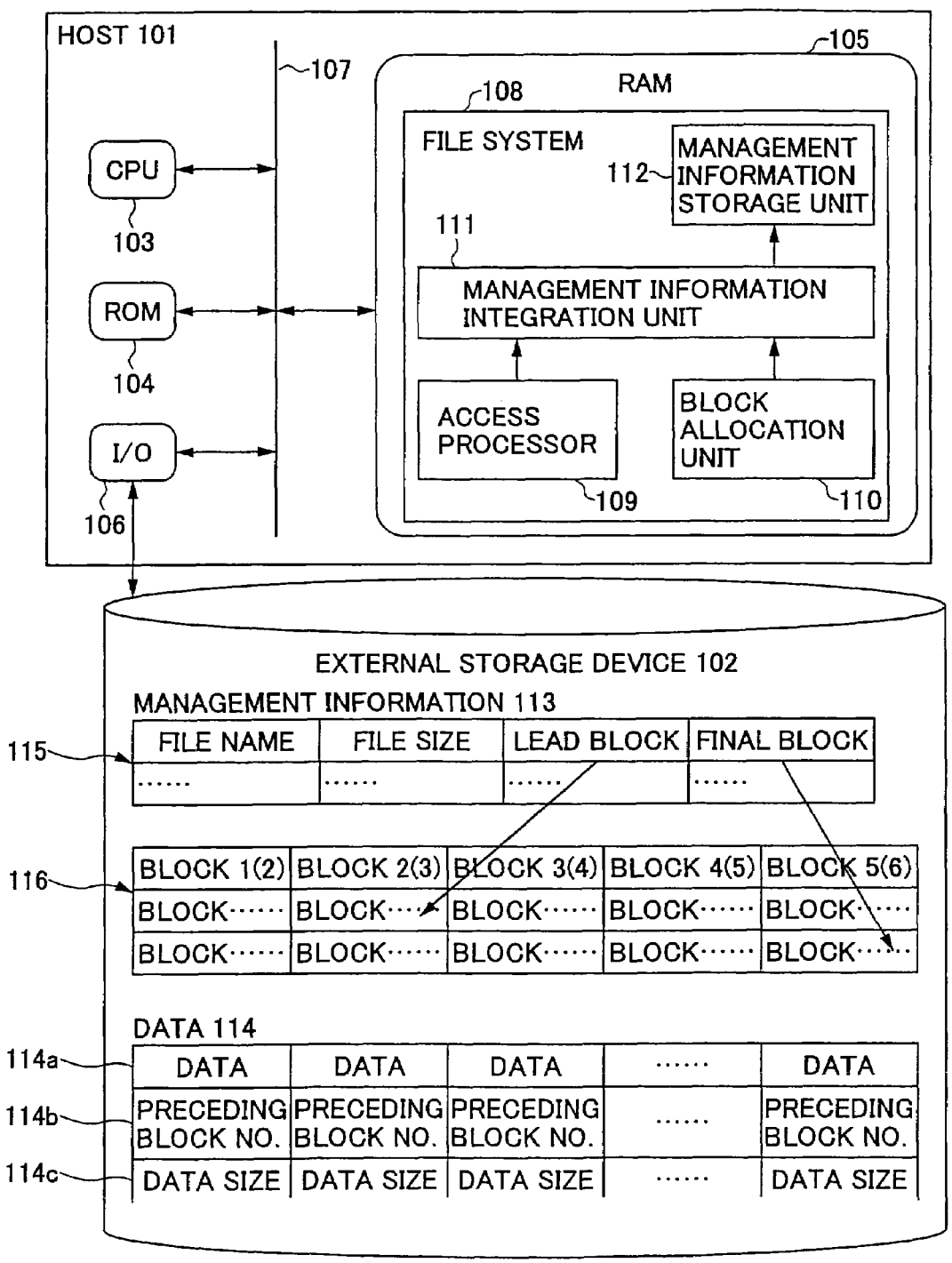
FIG. 3 is a block diagram of a first embodiment of the present invention.

FIG. 3 is a block diagram of a first embodiment of the present invention.

The file device 100 of the present invention is composed of a host computer 101 and an external storage device 102.

The host computer 101 comprises a CPU 103, ROM 104, RAM 105 and an input/output interface 106 all connected by a bus 107, and controls the external storage device 102.

The CPU 103 performs all manner of controls using applications stored in the ROM 104. The RAM 105 is used as the work memory of the CPU 103.

The file system 108 of the present embodiment is achieved by the applications stored in the ROM. The applications that achieve the file system 108 are opened by the RAM 105 during execution and are executed by the CPU 103.

The file system 108, as its function block, is composed of an access processor 109, a block allocation unit 110, a management information integration unit 111 and a management information storage unit 112. The access processor 109 controls the writing of data to the external storage device 102 and the reading of data from the external storage device 102.

The block allocation unit 110 divides the file that is to be written to the external storage device 102 and allocates it among previously divided blocks in the external storage device 102. The management information integration unit 111 manages the management information on an integrated basis. The management information storage unit 112 temporarily manages the management information.

The external storage device 102 is composed of a hard disk drive and the like. In the external storage device 102, management information 113 and file data 114 are stored in block units.

The management information 113 stored in the external storage device 102 and the management information storage unit 112 of the host computer 101 is composed of file management information 115 and block allocation information 116. The file management information 113 is composed of a file name, file size, lead block number and final block number, and is set for each file.

The block allocation information 114 is composed of either the succeeding block number for each block number or information indicating that it is the last, or information indicating that it is unallocated.

The file data 114 is composed of the data 114$a$, preceding block number 114$b$, and data size 114$c$. The data 114$a$ is data that is divided into blocks. The preceding block number 114$b$ is a block number of a block containing data that continues before the data of that block. The data size 114$c$ is the size of the data contained in that block. When recording valid data to a block, the data size 114$c$ becomes a value within a size range of the block.

A description will now be given of a file write operation according to the file system 108.

Figure 4:
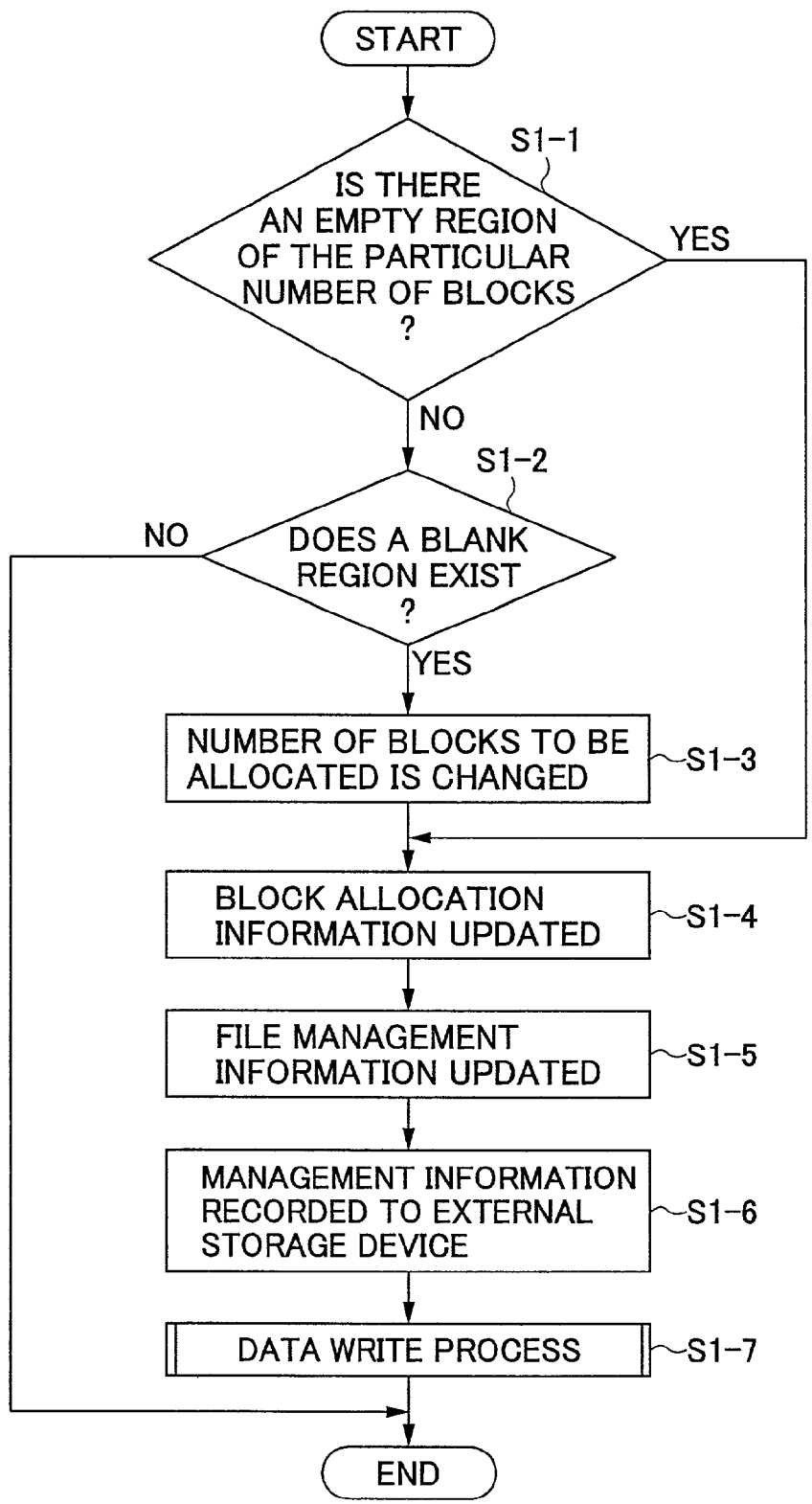
FIG. 4 is a flow chart of a file write operation of a file system of a first embodiment of the present invention.

FIG. 4 is a flow chart of a file write operation of a file system of a first embodiment of the present invention.

The file system 108, when there is a file write request, first determines (in a step S1-1), whether or not there is an empty region of a previously specified particular number of blocks in the external storage device 102.

If in step S1-1 the particular number of blocks in the external storage device 102 is not available, then (in a step S1-2) it is determined whether or not there is an empty region itself for recording data in the external storage device 102.

If in step S1-2 it is determined that there is no empty region in which to record data in the external storage device 102, then the file cannot be recorded and thus the file write operation terminates.

However, if in step S1-2, it is determined that there is an empty region for storing the data in the external storage device 102, then (in a step S1-3) the particular number of blocks is converted into a number of blocks keyed to the empty region.

In the event that in step S1-1 there is an empty region of the previously specified particular number of blocks in the external storage device 102, and in the event that in step S1-3 an empty region is set in a number of blocks keyed to the empty region, then (in a step S1-4) blocks of the set number of blocks are allocated as management information for the file to be written in the block allocation information 116 of the management information storage unit 112.

In step S1-4, when the block allocation information 116 is updated, then (in a step S1-5) the file management information 115 is updated based on the block allocation information 116.

In step S1-5, when the file management information 115 is updated, the file management information 115 as well as the block allocation information 116 updated in step S1-4 and step S1-5 is recorded to the external storage device 102 (in a step S1-6). After the management information has been recorded in the external storage device 102 in step S1-6, the data that makes up the file is recorded in the external storage device 102 in accordance with the stored management information 113 (in a step S1-7).

Here, a detailed description will now be given of the process of writing a file to the external storage device 102 of step S1-7.

Figure 5:
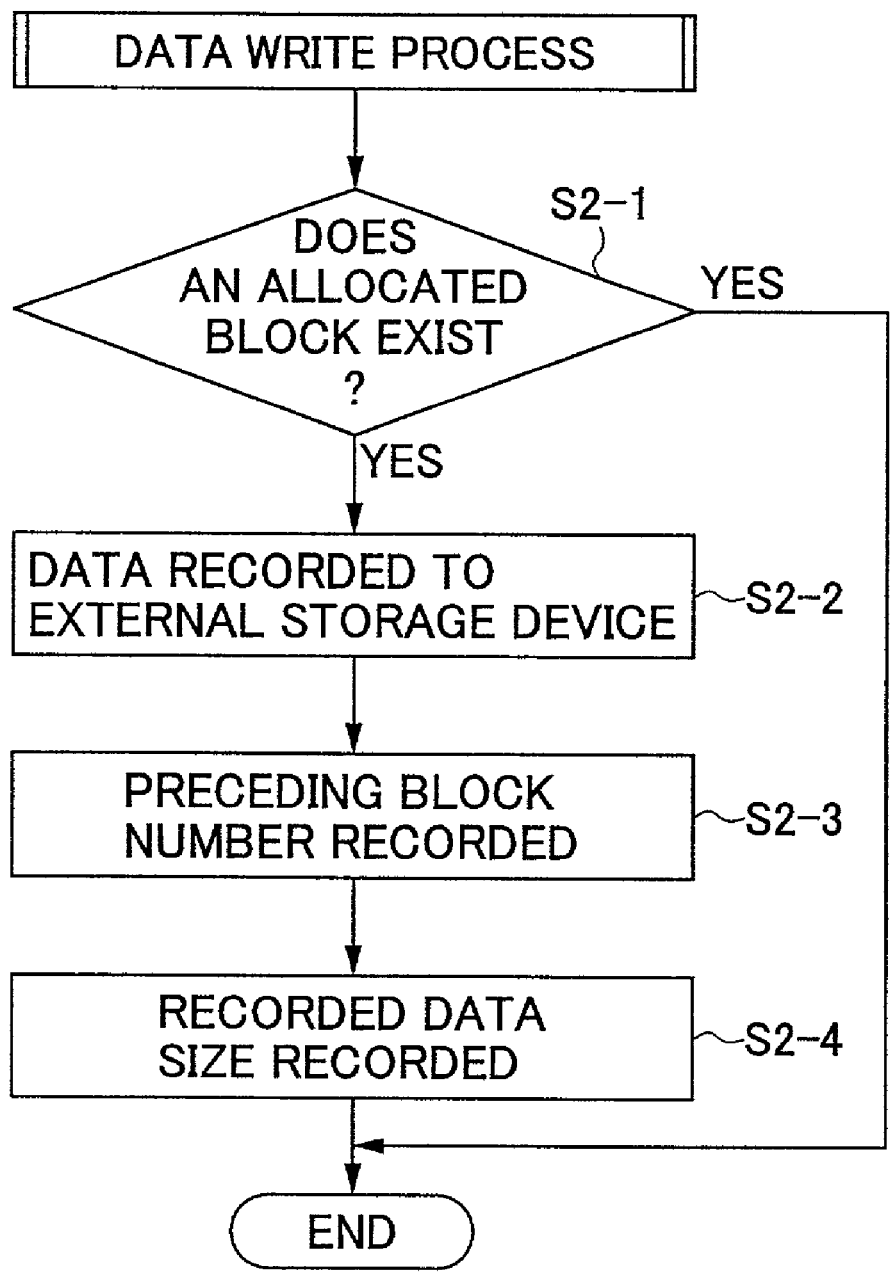
FIG. 5 is a flow chart of a file write operation of a file system in a first embodiment of the present invention.
Figure 6:
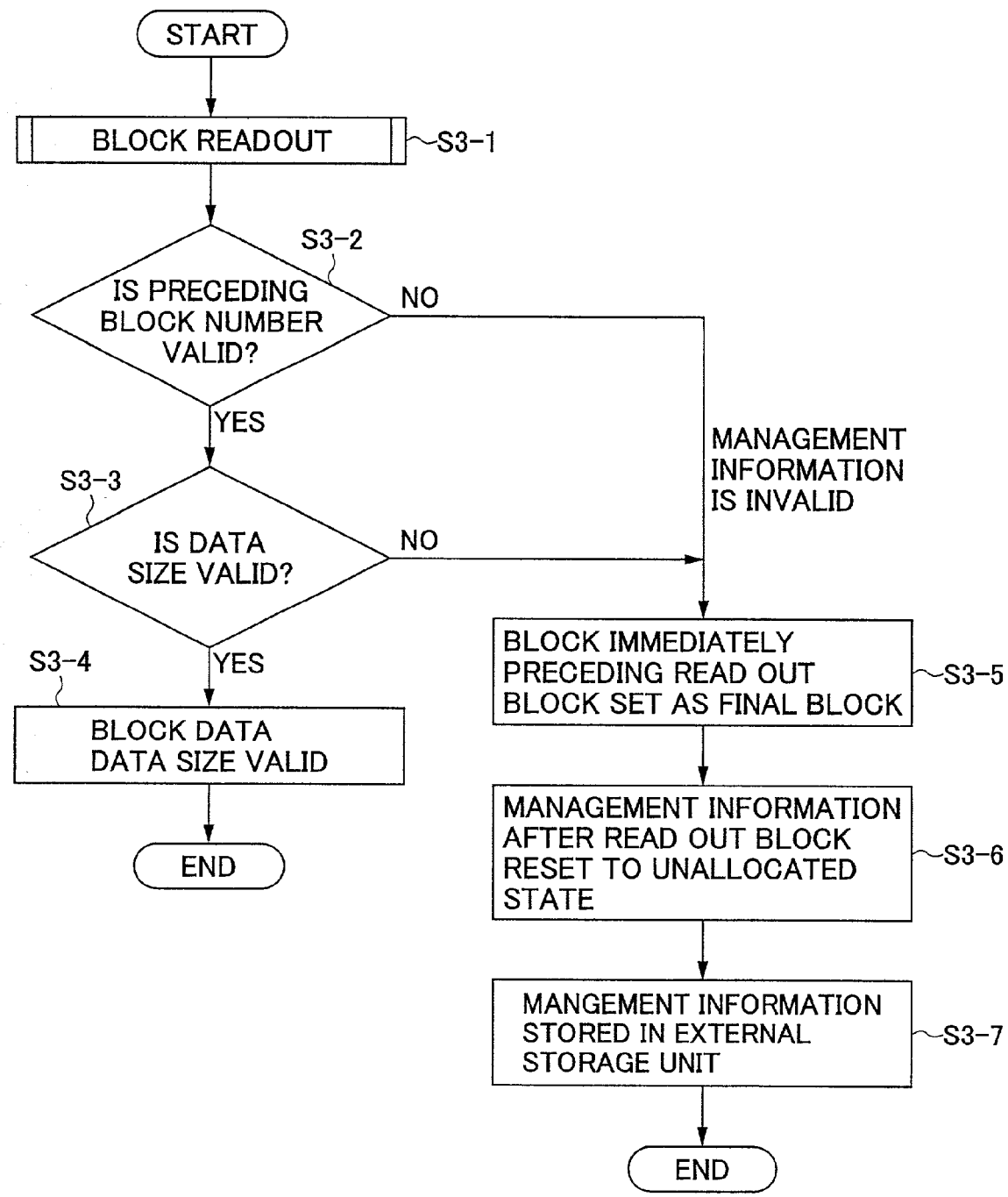
FIG. 6 is a flow chart of a file system file read operation of a first embodiment of the present invention.

FIG. 5 is a flow chart of a file write operation of a file system in a first embodiment of the present invention.

In the process of writing a file to the external storage device 102 in step S1-7, it is first determined (in a step S2-1), whether or not an allocated block exists in the external storage device 102.

If in step S2-1 no allocated block exists in the external storage device 102, then the process terminates. Additionally, in step S2-1, if an allocated block exists in the external storage device 102, then (in steps S2-2, S2-3, S2-4) a block number of a block that recorded preceding data as well as a size of data recorded in a block are added to the data.

As per the above, the writing of a file to the external storage device 102 is completed.

A description will now be given of an operation of reading out a file written as described above.

Initially, the file system 108 reads management information 113 from the external storage device 102 and based on the read out management information 113 reads out (in a step S3-1) data from a block in which data of the requested file is contained.

In step S3-1, the file system 108 records the management information 113 read out from the external storage device 102 in the management information storage unit 112. Next, the file system 108 checks the file management information 115 within the management information recorded in the management information storage unit 112, identifies the lead block number of the file name of the requested file, accesses the block of the identified block number, and reads out the data.

The preceding block number recorded in the data of the block read out in step S3-1 is read out and a determination is made (in a step S3-2) as to whether or not it is valid.

The determination made in step S3-2 is performed by referring to the preceding block number 114b of the data read out in step S3-1 and determining whether or not there is a match with the block number of the block read out previously. It should be noted that, if there is a match between the two, then the data is deemed valid. It should be noted that in the case of the lead block there is no block read out previously, so the data is deemed valid if it is information indicating that data indicating a block number does not exist.

In step S3-2, if the preceding block number is effective, then a determination is made (in a step S3-3) as to whether or not the data size of the data recorded in the next block is valid.

The determination made in step S3-3 is performed by determining if the data size in the data of the block is within the range of the size of the block. It should be noted that, if the size is within the range of the size of the block, then the data is deemed valid.

If in step S3-3 it is determined that the block data size is valid, then (in a step S3-4) data of the validated data size from among the blocks just read is made valid.

It should be noted that data of a desired file is read out by checking the block allocation information 116 of the management information 113, identifying the succeeding block number, accessing the block of the identified block number and reading out data, and repeating the aforementioned process until the results of the checking of the block allocation information 116 show information indicating a final block.

Additionally, in steps S3-2 and S3-3, if the block number of the preceding block and the data size of the block is invalid, then the management information 113 can be deemed invalid, which means that succeeding blocks cannot be read out properly. Here, the block immediately preceding the read out block is set as the final block (in a step S3-5), the management information 113 of the blocks after the read out block are updated to an unallocated state (in a step S3-6) and the updated management information 113 is recorded in the external storage device 102 (in a step S3-7).

As described above, even when the management information 113 becomes invalid it is still possible to read the data up to the block before the management information 113 becomes invalid.

A description will now be given of specific operations of the present embodiment, with reference to the drawings.

FIG. 7 is a diagram illustrating an operation of a first embodiment of the present invention, in which FIG. 7(A) shows the file management information 115 among the management information 113, FIG. 7(B) shows the block allocation information 116 among the management information 113, FIG. 7(C) shows the data composition of the file name "XXXA", FIG. 7(D) shows the data composition of the file name "XXXB" and FIG. 7(E) shows the data composition of the file name "XXXC".

For example, assume that a file with the file name "xxxC" in the process of being created in FIG. 7 has the data structure shown in FIG. 7. Files with file names "XXXA" and "XXXB" are files that have already been created, and are recorded with the file management information 115 and the block allocation information 116 as shown in FIG. 7(A) and 7B.

The file with the file name "XXXA" has a lead block number "1" and a final block number "5", and the file size is 2560 bytes. The individual blocks that compose the file name "XXXA", as shown in the block allocation information 116, are allocated in order so that after block number "1" comes block number "2", after block number "2" comes block number "3". . . and so forth, through to final block number "5".

It should be noted that information indicating that final block "5" is the final block of file name "XXXA" is allocated to final block "5". Additionally, in the block numbers that are not used information is recorded that indicates that such blocks are unallocated.

Similarly, in the actual data of the file name "XXXA", the number to the preceding block, the data size used by each block and data are recorded in each block. Thus, for example, in the block number "2", as shown in FIG. 7(C), the data size of the block number "1" of the preceding block is 512 bytes.

Information that indicates that it is the lead block is recorded in the block number "1" that is the lead block of the file name "XXXA".

Next, consider a case in which the file name "XXXC" is to be stored. First, a specific number of blocks is allocated to the file name "XXXC". Here, for example, the specific number of blocks is 4 blocks.

Next, the block allocation information 116 is checked, the unallocated blocks are searched, and the 4 blocks that make up the specific number of blocks are allocated among the unallocated blocks. At this time, if the number of unallocated blocks, that is, the 4 blocks, do not exist, then the remaining unallocated blocks are allocated. Additionally, if there are no unallocated blocks at all, then the system is notified to that effect.

When allocating blocks to the block allocation information 116, with respect to the block allocation information 116 stored in the management information storage unit 112 set in the RAM 105 of the host computer 101, first, after allocating the final block number, the sequence of the data sequence, that is, the block numbers, are set a sequence that is the reverse of the sequence in which the data is read out. Then, in the block number "12" that is the last black before updating, the next block number "13" is recorded.

Additionally, as shown in FIG. 7(A), the last block number of the file management information 115 stored in the RAM 105 of the host computer 101 is updated to "16", and the file size is updated to "4096 bytes". The file size "4096 bytes" indicates the data size when the allocated blocks are used to full capacity.

By updating the management information 113 before recording the file data of the file name "XXXC" and recording it in the external storage device 102 as described above, the management information in the external storage device 102 is always the latest information.

To continue, the data that makes up the file is stored in the allocated blocks.

FIG. 8 is a diagram illustrating an operation of a first embodiment of the present invention, in which FIG. 8(A) shows the file management information 115 within the management information 113, FIG. 8(B) shows the block allocation information 116 within the management information 113, FIG. 8(C) shows the composition of the data of the file name "XXXC" immediately after block allocation and FIG. 8(D) shows the composition of the data of the file name "XXXC" during block writing.

As shown in FIG. 8(C), as the data of the unused block number "13", the data itself as well as the block number "12" of the preceding block together with the data size "512 bytes" are written. This process is repeated until the either the end of the data or the last of the allocated blocks. In the event that all the allocated blocks are used, new blocks are allocated and the contents of the management information 113 are recorded to the external storage device 102, after which data is further recorded. It should be noted that the management information is set in the management information storage unit 112 which is set in the RAM 105, so there is no need to access alternatively in order to obtain the management information and the data from the external storage device 102. As a result, excessive seek processes do not occur.

When the last of the data used to create a file is stored and not all the allocated blocks have been used or when the entire data size of the allocated block has not been used, the management information is updated in accordance with the actual amount of data used.

FIG. 9 is a diagram illustrating an operation of a first embodiment of the present invention, wherein FIG. 9(A) shows the file management data 115 prior to updating the management information, FIG. 9(B) shows the block allocation information 116 prior to updating the management information, FIG. 9(C) shows the data composition of the file name "XXXC", FIG. 9(D) shows the management information 115 after updating the management information, and FIG. 9(E) block allocation information 116 after updating the management information.

Up to block number "16" is allocated for the file name "XXXC", but in case only up to block "15" is actually used, first the management information 113 stored in the management information storage unit 112 set in the RAM 105 of the host computer 101 is updated.

The allocation information 116, after setting information indicating that the block number "15" of the last block used as shown in FIG. 9(D) from the condition shown in FIG. 9(B), is updated by setting information indicating that block number "16" is the last block. Additionally, the file management information 115 is updated from the condition shown in FIG. 9(A) to show that the final block number is "15" as shown in FIG. 9(E), and also updated to show the file size is updated to "3600 bytes".

Here, assume that the data as well as the management information 113 in the states shown in FIGS. 8(A)-8(C) suffer a system failure, and data cannot be stored in the external storage device 102.

To remove the failure affecting the system and access the file name "XXXC", first, the management information 113 stored in the external storage device 102 is stored in the management information storage unit 112 set in the RAM 105 of the host computer 101.

Next, the lead block number "9" of the file name "XXXC" is accessed according to the file management information 115 of the management information 113 stored in the management information storage unit 112.

Then, from the block data of the block number "9" the preceding block as well as the data size of the present block is checked and the data searched for validity by ascertaining that this is not a state in which there is information indicating that the preceding block number is the lead block and that the current block data size is unallocated and further, that the block data is at or below block size. The file system 108 then outputs data if the search results here are valid.

Next, the file system 108 checks the block allocation information 116 and accesses the succeeding block "10" after block "9". Next, from the block data of block number "10" the preceding block number as well as the current block data size is checked and the data searched for validity by ascertaining that this is not a state in which the preceding block number "9" and the current block data size is unallocated, and further, that the block data is smaller than block size. The file system 108 then outputs data if the search results here are valid.

The above-described process is repeated until block number "12". Then, the block allocation information 116 is checked and the block of the block number "13" that succeeds the block number "12" is accessed. The block number "13" is either the preceding block number or a state in which the current block data size is unwritten, so the file system 108 understands that no more data will be recorded and stops the readout of data from the external storage device 102. By so doing, it is possible to correctly read out the data even in a case in which a failure occurs and the content of the management information and the content of the actually written data are inconsistent.

Additionally, data is continuously recorded after the write data blocks are allocated and the contents of the management information are recorded to the external storage device 102, so the contents up to the written data can always be read out.

Additionally, data is continuously recorded after the write data blocks are allocated and recorded to the external storage device 102, so blocks are already allocated after the occurrence of a failure. As a result, even if new data is recorded before carrying out the recovery process there is no danger that the new data will be written over blocks that have been previously recorded with data.

Furthermore, even if a failure occurs during updating of the block data, the preceding block number and the current block data size, the preceding block number and the current block data size are updated after data is recorded, and in a case in which the preceding block number and the current block data size have not been properly recorded they are not recognized as data, and thus data can be read out properly.

Additionally, in the above-described state, if a determination is made that the management information and the actually recorded data are not consistent, then the management information is updated in accordance with the actually recorded data. With respect to the data and the management information 113, in the states shown in FIGS. 8(A)-8(C) as a result of the readout process, data is only recorded up to block number "12".

Accordingly, after setting block number "13" in block number "12" in the file management information 115 of the management information 113 by the management information storage unit set in the RAM 105 of the host computer 101, an area from block number "13" to block number "16" in which data is not recorded are set while allocating blocks.

Additionally, the file size of the file name "XXXC" in the file management information 115 and the final block number are different, so each is corrected.

After the management information 113 of the management information storage unit 112 set in the RAM 105 of the host computer 101 is corrected, the management information 113 is stored in the external storage device 102. When the data is read out, the inconsistency between the management information and the written data is discovered, and the discrepancy can be repaired using the information obtained at that time.

It should be noted that, in the present embodiment, although a description has been given with respect to a composition in which a series of data makes up a file, the embodiment is applicable as well to a case in which a plurality of different types of data are taken into a single file.

Figures 11, 12A, 12B:
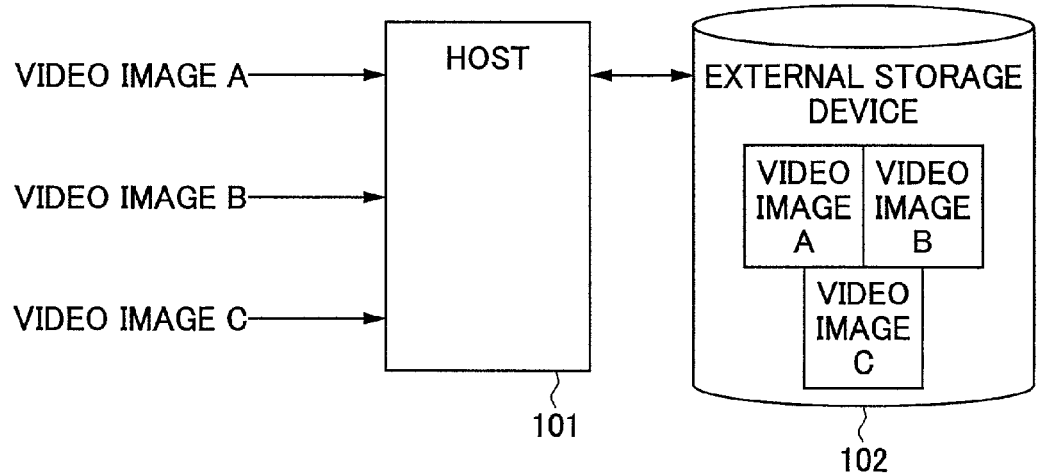
FIG. 11 is a block diagram of a second embodiment of the present invention.

FIG. 11 is a block diagram of a second embodiment of the present invention. Constituent parts in FIG. 11 that are the same as those in FIG. 3 are given the same reference numbers, and a description thereof is omitted.

The present embodiment references an application in a system that records a plurality of video images in an external storage device such as a hard disk drive or the like and reproduces the video images recorded in the hard disk drive.

As shown in FIG. 11, three video images A, B and C are input into the host computer 101 at the same time. The host computer 101 records the three video images A, B and C without leakage in the external storage device 102.

At this time, in order to carry out access to the external storage device 102 effectively, the file system 108 sets the number of video image channels and the transfer rate, the number of blocks of data to be written at any one access, and the access scheduling based on the degree of priority of each access.

FIG. 12 is a diagram illustrating a scheduling of a second embodiment of the present invention.

As shown in FIG. 12(A), the video image B has an encoding rate that is twice that of video image A and video image C and the number of blocks transferred at time of access to the external storage device 102 is the same. Additionally, video images A, B and C are assumed to have the same degree of priority.

The recording of video images A, B and C according to the results of the scheduling involves, as shown in FIG. 12(B), recording video image A over blocks after recording video image B over 4 blocks, and further, recording video image C over 4 blocks after recording video image B over 4 blocks. This process is continued until the recording of each video image is completed. Additional scheduling is conducted in the event that conditions change during recording, such as the number of channels increases or decreases.

Next, the allocation of blocks is carried out based on the scheduling information and data is recorded.

FIG. 13 is a diagram illustrating an operation of a second embodiment of the present invention. FIG. 13(A) shows the file management information 115, FIG. 13(B) shows the block allocation information 116 and FIG. 13(C) shows the data. FIG. 13, is the contents of the management information and the data after a video image has once been recorded.

As per the scheduling sequence, first, video image B is recorded from block number "1" through block number "4", after which video image A is recorded from block number "5" through block number "8".

Continuing, similarly, video image B is recorded from block number "9" through block number "12", after which video image C is recorded from block number "13" through block number "16". Thereafter, allocation of the storage blocks is carried out prior to storage of succeeding data.

In accordance with the scheduling sequence, the block allocation information of the management information stored in the host RAM is updated. First, as a region for storing the video image B the area from block number "17" to block number "20" is retained. Next, for video image A the area from block number "21" to block number "24" is retained and, after once again retaining the area from block number "25" to block number "28" for video image B, the area from block number "29" to block number "32" is retained for video image C. To continue, the information of the allocated blocks is applied to the file management information 115, after which the management information 113 is stored in the external storage device 102. When storing the data of each video image, video image data is stored in the allocated blocks of each individual region.

It should be noted that, although as shown in the example of FIG. 13 regions are allocated in tandem with one scheduling cycle, it is also possible to allocate regions across a plurality of scheduling cycles. At such time, after allocating areas there is a possibility that the scheduling sequence will be changed due to changes in conditions, in which case rescheduling is carried out taking into consideration access to the allocated regions. Blocks are once again allocated for each video image in accordance with the scheduling information in order to carry out access efficiently, so while carrying out efficient access the occurrence of an inconsistency between the management information and the data is unlikely and, in the event of such an occurrence, can be corrected easily.

It should be noted that, although in the present embodiment the block number and data size are added before the data as shown in FIG. 13(C), it is also acceptable to add the block number of the succeeding block.

FIG. 14 is a diagram illustrating an operation of a third embodiment of the present invention.

It should be noted that the composition of the present embodiment is the same as that of FIG. 11, so a description thereof is omitted.

Additionally, the scheduling is also the same as the scheduling of the second embodiment shown in FIG. 12, so a description thereof is omitted.

As shown in FIG. 14, the latest management information is recorded in the management information recorded in the management information storage unit 112 set in the RAM 105 of the host computer 101.

By contrast, in the external storage device 102 is recorded the management information 113 previously stored from the management information storage unit 112 to the external storage device 102. When storing individual video images according to the scheduling, first the storage area for the video image scheduled first is retained.

At this time, first, an unallocated region is sought using the block allocation information 116 of the management information 113 recorded in the management information storage unit 112 set in the RAM 105 of the host computer 101, it is confirmed that an area from block number "17" to block number "20" is empty, and the blocks are allocated. Next, the data of the video image B is recorded in the allocated area, from block number "17" to block number "20". At this time, the succeeding block number and the preceding block number and the data size used by the blocks are attached to the video image B data and recorded.

It should be noted that, when recording the final block, the succeeding block number involves seeking a block in which to record the succeeding video image B on the basis of the scheduling information and storing that block number.

Finally, the file management information 115 stored in the RAM 105 of the host computer 101 is updated. The last block to be allocated to the video image B is set at block number "20" and the management information is updated according to the volume of data to be stored.

Additionally, when the video image B is next recorded, the block number that is to be the lead block of the storage area is recorded as a provisionally allocated block number.

The above-described processes are adjusted to the scheduling and conducted in order from video image A through video image C. Additionally, in the event that there is a change in conditions during recording of the video images and the scheduling of the disk access is altered, storage area allocation and data recording are conducted in accordance with the new scheduling.

At this time, in the event that the provisionally allocated block set previously cannot be used due to changes in the scheduling, the provisionally allocated block is changed to a new block number and reflected in the management information of the RAM 105 of the host computer 101, with recording starting from that block. If the management information 113 consumes more than the number of blocks allocated by previously set condition or if the processing time has expired, then the management information 113 of the RAM 105 of the host computer 101 is stored in the external storage device 102. The management information 113, after recording the data, is recorded to the external storage device 102, so if a change in the scheduling occurs it is possible to respond quickly, recording block data appropriate to the new scheduling.

Next, consider a case in which a failure occurs in the state shown in FIG. 14. At this time, the management information 113 recorded in the management information 112 set in the RAM 105 of the host computer 101 is lost. As a result, access is carried out based on the management information 113 stored in the external storage device 102. In reading out video image B after a failure has occurred, the management information 113 recorded in the external storage device 102 is read out to the RAM 105 of the host computer 101, and the data read out according to the contents of the management information 113.

After reading out to the final block number "12" recorded in the block allocation information of the management information 113, the succeeding block number attached to the final block number "12" and recorded is checked and that block number "17" is accessed. At the block number "12" that precedes the block number "17", after it is determined that the current block data size is not unallocated, is not an inappropriate value, and, for example, is not a data size larger than the block data size "512 bytes", the block number "17" data is made valid. In similar fashion, the data of the video image B stored in the external storage device 102 is accessed. By so doing, even after the occurrence of a failure it is still possible to correctly access the video image B data sequence.

However, if the post-failure condition is left uncorrected, because the management information recorded in the external storage device 102 and the actually recorded data are different, there is a danger that any new data will be written over a valid block. Accordingly, after each data sequence has been accessed to the last as per the above-described method, and after the management information stored in the RAM 105 of the host computer 101 has been updated, the data is recorded to the external storage device 102. By so doing, the management information 113 recorded in the external storage device 102 is brought up to date so that already recorded data will not be written over and erased.

According to the above-described embodiment, by storing a file after pre-allocating blocks that record the file to an external storage means and recording management information indicating the allocated blocks to the external storage means, the management information is not lost even if a failure occurs during storage of the file, and accordingly, it is possible to read out the data already recorded in the file based on the management information.

Additionally, by adding information indicating the preceding block as well as information indicating the size of the data to be recorded in the block to the data recorded in each block, even in a case in which the management information and the recorded data are inconsistent when the file is read out it is possible to identify valid data by checking the preceding block and the size of that data.

Further, by updating the management information so that, when a file is stored, if a block in which no data is recorded appears among the allocated blocks, the unrecorded block becomes an unused block, it is possible to use the block for other files, and thus it is possible to make effective use of unrecorded blocks.

Additionally, by pre-setting the order of storage of the data that make up a file and recording the data that makes up the file to the allocated blocks based on the set order, it is possible to access the files efficiently.

Further, by accessing the blocks in order according to the management information, reading out the file, and, as a result of reading out the data from the block, when the information that indicates the preceding block does not indicate the preceding block, or when the data that indicates the size of the data recorded in the block is not within the actual block size range, stopping the file readout and updating the management information so that the blocks thereafter become unused blocks, the readout of incorrect data can be halted and, because the management information can be updated so that the blocks in which the incorrect data is recorded become unused blocks, the blocks can be used for other files, making it possible to make effective use of the unrecorded blocks.

What is claimed is:

1. At least one computer-readable medium in a host computer encoded with instructions to control accessing data in a storage divided into blocks, comprising:
    allocating blocks to record a file;
    producing management information indicating the blocks that have been allocated; and
    recording, in the blocks in an external storage device, the file, and the management information and sequence information indicating a sequence in which the file is to be recorded in the blocks before recording the file in the external storage device, where the external storage device is external to said host computer.

2. A file device for recording a file to an external storage device divided into blocks, comprising:
    block allocation means for allocating blocks in the external storage device to record a file accessed by said file device;
    management information means for producing management information indicating the blocks that have been allocated; and
    storage control means for recording in the blocks in the external storage device the file, after recording the management information and sequence information indicating a sequence in which the file is to be recorded in the blocks in the external storage device, where the external storage device is external to the storage control means.

3. A computer implemented data access method for accessing a storage device divided into blocks, comprising:
    allocating blocks to record a file accessed by a computer;
    producing management information indicating the blocks that have been allocated; and
    recording in the blocks in the external storage device with the file, the management information and sequence information indicating a sequence in which the file is to be recorded in the blocks in the external storage device before recording the file in the external storage device, where the external storage device is external to said computer.

4. A computer file device for accessing data in an external storage device divided into blocks, comprising:
    a block allocation unit allocating blocks in the external storage device to record a file accessed by said computer file device;
    a management information unit producing management information indicating the blocks that have been allocated; and
    a storage controller recording in the blocks in the external storage device with the file, the management information and sequence information indicating a sequence in which the file is to be recorded in the blocks before recording the file in the external storage device, where the external storage device is external to the storage controller.

5. A computerized file access method to control accessing data in a storage device divided into blocks, comprising:
    allocating blocks to record a file accessed by a computer;
    producing management information indicating the blocks that have been allocated;
    recording in the blocks in the external storage device the file; and
    recording in the blocks with the file, the management information and sequence information indicating a sequence in which the file is to be recorded in the blocks before recording the file in the external storage device , where the external storage device is external to said computer.

6. The at least one computer-readable medium as claimed in claim 1, wherein said recording of the sequence information includes recording an identifier of a preceding block in each block after an initial block.

7. The file device as claimed in claim 2, wherein the storage control means attaches information indicating a preceding block and information indicating a size of data to be recorded in a block to the data recorded in the block and records same to the storage control means.

8. The file device as claimed in claim 2, wherein the storage control means updates the management information so that, when a data-unrecorded block occurs among the blocks allocated by the block allocation means when recording the file, the unrecorded block becomes an unused block.

9. The file device as claimed in claim 2, wherein:
    the storage control means has storage sequence setting means for setting a storage sequence of data that makes up the file; and
    the data that makes up the file being allocated among blocks to be recorded by the block allocation means based on the sequence set by the storage sequence setting means and recorded to the allocated blocks.

10. The computer implemented data access method as claimed in claim 3, wherein said recording in the blocks with the file attaches to each block that records with the file, data indicating a preceding block and data indicating a size of data to be recorded therein.

11. The computer implemented data access method as claimed in claim 3, further comprising updating the management information so that when an unrecorded block occurs, among the blocks allocated when recording the file, the unrecorded block becomes an unused block.

12. The computer implemented data access method as claimed in claim 3, wherein said recording of the file allocates blocks that are to record data that makes up the file in said allocating based on previously-set storage sequence of the data that makes up the file and records the data to the allocated blocks.

13. The computer file device as claimed in claim 4, wherein the storage controller attaches information, indicating a preceding block and information indicating a size of data to be recorded in a block, to the data recorded in the block and records the data with the attached information in the storage unit.

14. The computer file device as claimed in claim 4, wherein the storage controller updates the management information so that, when an unrecorded block of data in the file occurs among the blocks allocated by the block allocation unit when recording the file, the unrecorded block becomes an unused block.

15. The computer file device as claimed in claim 4,
    wherein the storage controller includes a storage sequence setting unit setting a storage sequence of data that makes up the file; and
    wherein the data that makes up the file is allocated among blocks to be recorded by the block allocation unit based on the sequence set by the storage sequence setting unit and recorded to the allocated blocks.

16. The file device as claimed in claim 4, further comprising:
    a file accessing unit accessing the blocks in sequential order according to the management information to read the file and, when either the information indicating the preceding block does not indicate the preceding block in the file or the information indicating a size of data recorded in the one or more blocks is not within an actual block size range, stopping the reading of the file and updating the management information so that succeeding blocks become unused blocks.

17. The computerized file access method as claimed in claim 5, wherein said recording the file further comprises attaching, to each block that records the file, data indicating a preceding block and data indicating a size of data to be recorded therein.

18. The computerized file access method as claimed in claim 5, further comprising updating the management information so that when an unrecorded block occurs, among the allocated blocks when recording the file, the unrecorded block becomes an unused block.

19. The computerized file access method as claimed in claim 5, wherein said allocating of the blocks that are to record data that makes up the file is based on a previously-set storage sequence of the data that makes up the file.

20. The at least one computer-readable medium as claimed in claim 6, wherein said recording further includes recording in each block, size information indicating an amount of data recorded therein.

21. The file device as claimed in claim 2, further comprising:
file accessing means accessing the blocks in sequential order according to the management information to read the file and, when either the information indicating the preceding block does not indicate the preceding block in the file or the information indicating a size of data recorded in the one or more blocks is not within an actual block size range, for stopping reading of the file and for updating the management information so that succeeding blocks become unused blocks.

22. The data accessing method as in claim 10, further comprising:
accessing the blocks in sequential order according to the management information to read the file; and
when either the information indicating the preceding block does not indicate the preceding block in the file or the information indicating a size of data recorded in the one or more blocks is not within an actual block size range, stopping the reading of the file and updating the management information so that succeeding blocks become unused blocks.

23. The computerized file access method as in claim 17, further comprising:
accessing the blocks in sequential order according to the management information to read the file; and
when either the information indicating the preceding block does not indicate the preceding block in the file or the information indicating a size of data recorded in the one or more blocks is not within an actual block size range, stopping the reading and updating the management information so that succeeding blocks become unused blocks.

24. The at least one computer-readable medium as claimed in claim 20, further comprising confirming the preceding block and the size of the data recorded in the block to identify valid data even when a disparity exists between the management information and the data recorded in at least one block, when reading out a file.

* * * * *